UNITED STATES PATENT OFFICE.

WILLIAM J. MARSHALL, OF NEW YORK, N. Y., ASSIGNOR TO HIMSELF AND ISAAC M. BIRD, OF NEW YORK, N. Y., AND FRANK E. ROWLAND, OF BROOKLYN, NEW YORK.

PERFUMED STARCH AND PROCESS OF MAKING THE SAME.

No. 890,524.　　　　Specification of Letters Patent.　　　　Patented June 9, 1908.

Application filed July 14, 1906. Serial No. 326,257.

*To all whom it may concern:*

Be it known that I, WILLIAM J. MARSHALL, a citizen of the United States, residing in the borough of Brooklyn, in the city and State of New York, have invented a certain new and useful Improvement in Perfumed Starch and Processes of Making the Same, of which the following is a specification.

My improved starch gives a lasting perfume to the clothes on which it is applied, and after the ordinary treatment by drying and ironing, leaves the surface repellant of dirt without any gloss.

The following is a description of what I consider the best means of carrying out the invention: I prepare a material which aids in holding the perfume and also in performing the duties of binding and blending. The important quality of repelling the adhesion of any foreign matter, dirt, is also promoted by this menstruum. I will for brevity use the term "fixative" in referring to this material. I will give the quantities required for one pound of the starch. To make the fixative I mingle tertiary butyl-toluene with about five times its weight of a mixture of equal parts of nitric acid and sulfuric acid at ordinary temperature, and raise and hold this mixture at about 210° Fahr.; the most convenient mode of attaining this being by water bath. After holding it, with or without gentle agitation, at this temperature for eight or nine hours and allowing it to cool, I add one-third its weight of commercial alcohol and allow it to stand quiet for a brief period. Fine crystals are formed which I remove by filtering or otherwise. These crystals constitute my fixative. I mingle with thirty grains of this fixative about ten drops of essential oil, giving the required perfume. I have experimented mainly with violet and heliotrope. I will describe this as being violet. In working in the large way we may say about one-third oil of violet and two-thirds my fixative. I add to this sufficient commercial alcohol, of a strength say about 94 per cent., and treat it in a water bath until dissolved; usually twenty minutes will suffice. This solution is then sprayed upon a good quality of potato, or other ordinary, starch either in lump or powdered form. It may be subsequently ground in a mill and bolted through a very fine bolting cloth to thoroughly distribute the perfume throughout the starch. This should, before using, be allowed to stand in a closed receptacle for at least four or five hours to allow the fixative and the oil to thoroughly permeate the cells of the finely divided starch.

For transportation and sale I put up the starch in small packages made of wax paper or other impervious material and there is ample time for uniform combination to be certainly effected before it is likely to be sold or used.

My experiments indicate that the perfume is given off very slowly and will, under all ordinary conditions after its use on clothing or other fabrics be retained with fair strength until the next washing.

The fabric thus starched is in the best condition for use; there is no gloss and yet there is no disposition to hold dirt.

The process does not impair any of the qualities of ordinary starch.

I am not certain whether any chemical reaction occurs at any stage, but have ascertained by repeated trials that the results are attained by proceeding as specified.

I do not in this patent claim the fixative or the method of manufacturing that portion of the product, such being made the subject of a separate application for patent filed on or about Oct. 12, 1907.

I claim as my invention:

1. The process described of treating starch by mingling tertiary butyl-toluene and equal parts of sulfuric acid and nitric acid holding for several hours at a temperature of about two hundred and ten degrees Fahrenheit, adding alcohol, separating the crystals which form, dissolving such crystals with essential oil in alcohol, applying the solution to starch, and allowing time for its uniform distribution, all substantially as herein specified.

2. The perfumed starch described comprising starch uniformly permeated with an essential oil, and with a fixative composed of the nitro derivatives of tertiary butyl-toluene and acid.

Signed at New York city in the county of New York and State of New York this tenth day of July A. D. 1906.

WILLIAM J. MARSHALL.

Witnesses:
　THOMAS DREW STETSON,
　LOUIS F. BRAUN.